(12) United States Patent
Kamo et al.

(10) Patent No.: US 8,262,062 B2
(45) Date of Patent: Sep. 11, 2012

(54) ROTARY VALVE

(75) Inventors: Shuji Kamo, Tokyo (JP); Takahiro Fukui, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 1308 days.

(21) Appl. No.: 11/834,521

(22) Filed: Aug. 6, 2007

(65) Prior Publication Data

US 2008/0029730 A1 Feb. 7, 2008

(30) Foreign Application Priority Data

Aug. 7, 2006 (JP) .................................. 2006-214397

(51) Int. Cl.
*F16K 5/10* (2006.01)
(52) U.S. Cl. ..................... 251/209; 251/286; 251/310
(58) Field of Classification Search .................. 251/286, 251/310, 208, 209, 206, 207; 137/625.3
See application file for complete search history.

(56) References Cited

U.S. PATENT DOCUMENTS

| 762,936 | A | * | 6/1904 | Paige | ........................ | 137/556.6 |
| 4,364,409 | A | * | 12/1982 | Jones | ........................ | 251/209 |
| 4,881,718 | A | * | 11/1989 | Champagne | ................... | 251/209 |
| 5,293,971 | A | * | 3/1994 | Kanari et al. | ............... | 188/282.1 |
| 5,372,224 | A | * | 12/1994 | Samonil et al. | ........... | 188/282.3 |

FOREIGN PATENT DOCUMENTS

| FR | 2580756 A1 | 10/1986 |
| JP | 62-117342 | 7/1987 |

* cited by examiner

*Primary Examiner* — John K Fristoe, Jr.
*Assistant Examiner* — Andrew J Rost
(74) *Attorney, Agent, or Firm* — Rabin & Berdo, P.C.

(57) ABSTRACT

In a rotary valve comprising a tubular housing (3) having, at the side part, a port (6) for communicating the inside and the outside thereof, and a tubular valve body (10) which is contained within the housing rotatably and has, at the side part, an orifice hole (11) capable of opposing to the port (6), the rotary valve of which the flow channel area formed by communicating the port (6) and the orifice hole (11) is changed by rotating the tubular valve body, at least one rotation stopping position with which the angle between the rotation stopping position at which the flow channel area is minimized and the rotation stopping position at which the flow channel area is maximized is equally divided, and the pressure loss differences between the adjacent rotation stopping positions are the same on condition that the passing flowing rate remains constant is provided.

10 Claims, 6 Drawing Sheets

ROTARY VALVE

TECHNICAL FIELD OF THE INVENTION

This invention relates to a rotary valve.

BACKGROUND ART OF THE INVENTION

A rotary valve provided with a tubular housing contained in a piston rod of a damper, and a tubular valve body rotatably inserted in this housing is known (See Japanese Utility Model Publication No. 62-117342). In this rotary valve, a port is formed by an oval hole extending along the circumferential direction and with variable widths in the axial direction at the side part of the housing, and the tubular valve body is provided with a circular hole capable of opposing to a part of the port.

In the conventional rotary valve, the tubular valve body is rotated in relation to the housing, thereby changing the flow channel area of the hydraulic oil by changing the degree of overlapping between the port and the circular hole. In another word, the damping force generated by the damper is adjusted by changing the pressure loss caused when the hydraulic oil is passing through the rotary valve.

SUMMARY OF THE INVENTION

However, in the conventional rotary valve, it was only possible to set the flow channel area to either one of maximum or minimum when changing the flow channel area by rotating the tubular valve body in relation to the housing.

An object of the present invention is to provide at least one rotation stopping positions in which differences in pressure loss between the respective rotation stopping positions are the same in between the rotation stopping position at which the flow channel area is minimized and the rotation stopping position at which the flow channel area is maximized in a rotary valve.

A rotary valve according to the present invention comprises a tubular housing having, at the side part, a port for communicating the inside and the outside thereof, and a tubular valve body which is contained within the housing rotatably in the circumferential direction and has, at the side part, an orifice hole capable of opposing to the port, the rotary valve of which the flow channel area formed by communicating the port and the orifice hole is changed by rotating the tubular valve body. As a rotation stopping position for the tubular valve body, at least one rotation stopping position with which the angle between the rotation stopping position at which the flow channel area is minimized and the rotation stopping position at which the flow channel area is maximized is equally divided, and differences in pressure loss between the adjacent rotation stopping positions are the same on condition that the passing flowing rate remains constant is provided.

DESCRIPTION OF THE PREFERRED EMBODIMENTS

Figure 1:
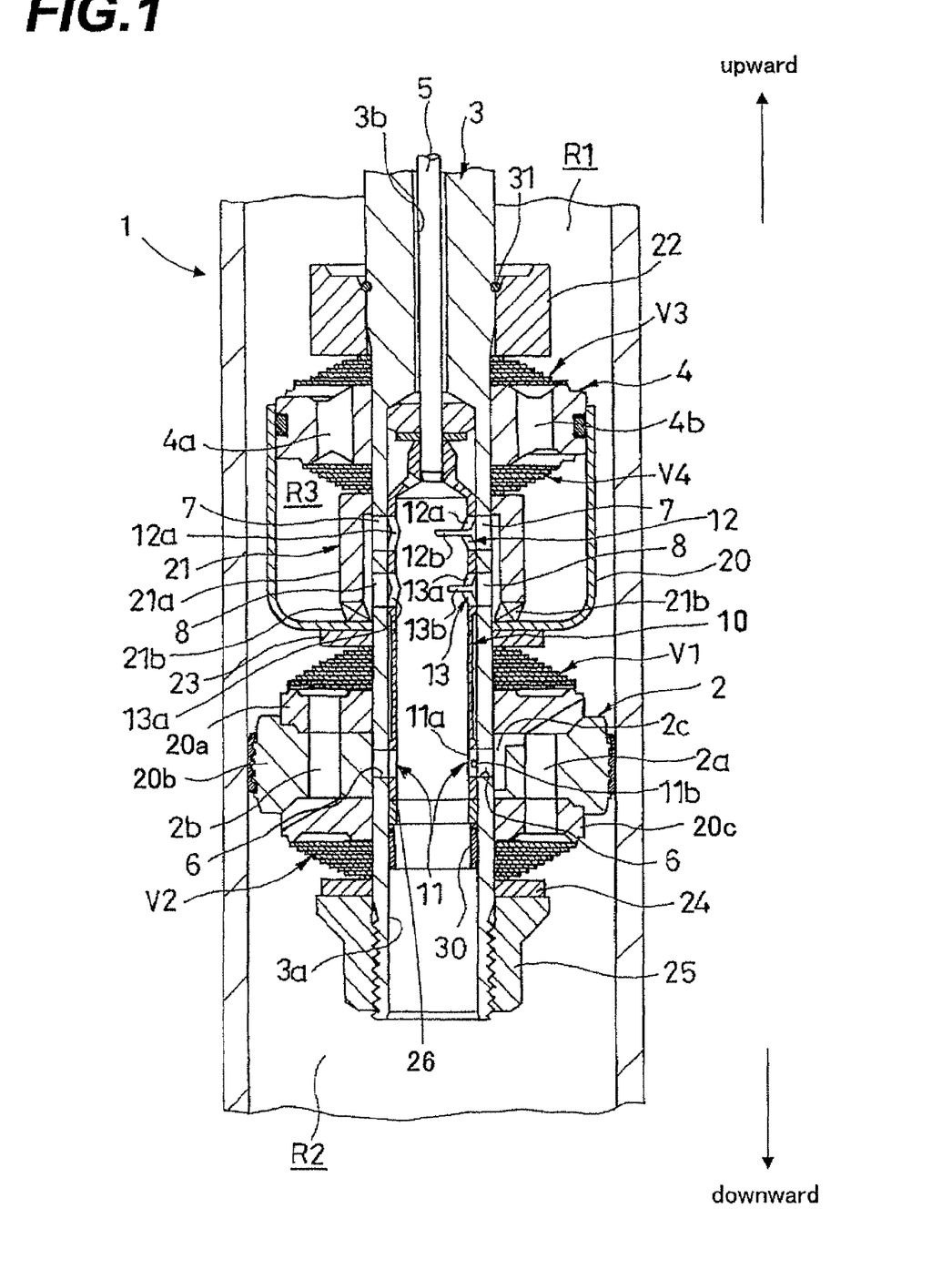
FIG. 1 is a longitudinal sectional diagram of a part of a damper equipped with a rotary valve in one embodiment.

The rotary valve of the present invention is, for example, used by being applied to a damper for damping force adjustment. This damper is, for example, used in a vehicle. FIG. 1 is a longitudinal sectional diagram of a part of the damper equipped with the rotary valve in the embodiment of the present invention.

The damper illustrated in FIG. 1 comprises a cylinder 1, a piston 2 and a piston rod 3. The piston 2 is inserted in the cylinder 1 in a freely slidable manner and partitions inside of the cylinder 1 into the one chamber R1 and the other chamber R2. In FIG. 1, the one chamber R1 is located above the piston 2, and the other chamber R2 is located below. The piston rod 3 is inserted in the cylinder 1 in a freely movable manner through the piston 2.

In the cylinder 1, the working fluid such as hydraulic oil is charged. The upper end and the lower end of the cylinder 1 is closed by a closing member (not illustrated) to maintain inside of the cylinder 1 under the liquid tight state.

It is to be noted that, to compensate the excess or deficient amount of the hydraulic oil within the cylinder 1 upon the expansion and contraction of the damper, although not illustrated, a gas chamber partitioned by a free piston inserted at the lower position within the cylinder 1, or a reservoir formed between the cylinder 1 and the outer cylinder enclosing the outer periphery of the cylinder 1 is provided.

At the upper end of the tubular cylinder 1, a rod guide (not illustrated) for rotatably supporting the piston rod 3 in a freely slidable manner is provided. The piston 2 and a valve disc 4 are fixed to the outer periphery of the lower end which is the tip end of the tubular piston rod 3. The valve disc 4 is provided at the one chamber R1 side.

The piston 2 is formed in ring-shape and is provided with an expanding side port $2a$, a compressing side port $2b$ and a passage $2c$. The expanding side port $2a$ communicates between the one chamber R1 and the other chamber R2 and functions as the port for passing through the hydraulic oil upon the expansion of the damper. The compressing side port $2b$ communicates between the one chamber R1 and the other chamber R2 and functions as the port for passing through the hydraulic oil upon the contraction of the damper. The passage $2c$ communicates between the expanding side port $2a$ and the inner periphery of the piston rod 3.

It is to be noted that, in FIG. 1, the piston 2 is formed of discs divided into three, upper, middle, and lower discs 20a, 20b, and 20c. The passage 2c is formed to the middle disc 20b.

Above the piston 2, a leaf valve V1 for opening and closing the compressing side port 2b is provided. The leaf valve V1 generates the damping force during the compressing stroke by creating resistance to the flow of the hydraulic oil moving from the other chamber R2 to the one chamber R1 through the compressing side port 2b.

On the other hand, below the piston 2, a leaf valve V2 for opening and closing the expanding side port 2a is provided. The leaf valve V2 generates the damping force during the expansion stroke by creating resistance to the flow of the hydraulic oil moving from the one chamber R1 to the other chamber R2 through the expanding side port 2a.

The valve disc 4 incorporated above the piston 2 has a shape of ring-shape. This valve disc 4 is also provided with the expanding side port 4a and the compressing side port 4b penetrating through the upper and lower part thereof. Above the valve disc 4, a leaf valve V3 for opening and closing the compressing side port 4b is provided, and a leaf valve V4 for opening and closing the expanding side port 4a is provided below the valve disc 4.

At lower side of the valve disc 4, the space R3 isolated from the one chamber R1 by a cap 20 of cylindrical shape having a bottom incorporated into the outer periphery of the piston rod 3 is provided. A spacer 21 of cylindrical shape having a bottom having the smaller diameter than that of the cap 20 is interveningly provided between the bottom part of the cap 20 and the leaf valve V4.

The inner diameter of the cylindrical part 21a of the spacer 21 is larger than the outer diameter of the piston rod 3. Thereby, the clearance gap is formed between the spacer 21 and the piston rod 3. Further, since a notch 21b is provided to the lower end of the cylindrical part 21a, even when the lower end of the cylindrical part 21a is contacted against the bottom part of the cap 20, a communicated state between the clearance gap between the spacer 21 and the piston rod 3, and the space R3 can be maintained through the notch 21b.

At the tip end of the piston rod 3, a stopper 22, the leaf valve V3, the valve disc 4, the leaf valve V4, the spacer 21, the cap 20, a valve stopper 23, the leaf valve V1, the piston 2, the leaf valve V2 and a valve stopper 24 are incorporated in this order from the above. Above described respective members are fixed to the piston rod 3 by a piston nut 25 which is screw fastened to the lowest end of the piston rod 3.

The stopper 22 prevents the upward movement in relation to the piston rod 3 by a retaining ring 31 installed to the outer periphery of the piston rod 3. The ring-shaped valve stopper 23 controls the amount of flexure of the leaf valve V1. The ring-shaped valve stopper 24 controls the amount of flexure of the leaf valve V2.

Within the inner periphery of the piston rod 3, a large diameter part 3a having large diameter is formed at the downward side in FIG. 1 which is the tip end side. On the other hand, a small diameter part 3b having small diameter is formed at the upward side from the large diameter part 3a in FIG. 1.

Within the large diameter part 3a, the tubular valve body 10 is contained in a freely rotatable manner in the circumferential direction. The upper end of the tubular valve body 10 is linked with the control rod 5 inserted in the small diameter part 3b of the piston rod 3. The control rod 5 is linked to the output shaft of the stepping motor (not illustrated) fixed to the upper end of the piston rod 3. Accordingly, the tubular valve body 10 can be revolved stepwise by each prescribed revolving angles in the circumferential direction, in relation with the piston rod 3, by driving the stepping motor.

In the case of the present embodiment, the housing of the rotary valve is the piston rod 3. It is to be noted that, in the inner periphery of the large diameter part 3a at the lower part of the tubular valve body 10, a resinous ring 26 is provided and the cylindrical member 30 is pushed-in. The cylindrical member 30 functions to prevent the tubular valve body 10 from dropping off from the piston rod 3 via the resinous ring 26.

At the side part of the piston rod 3, the port 6 for communicating the large diameter part 3a and the outer periphery thereof is provided. This port 6 is, as illustrated in FIG. 1, communicated to the one chamber R1 through the passage 2c and the expanding side port 2a of the piston 2, and at the same time, communicated to the other chamber R2 through the inside of the piston rod 3.

Figure 2:
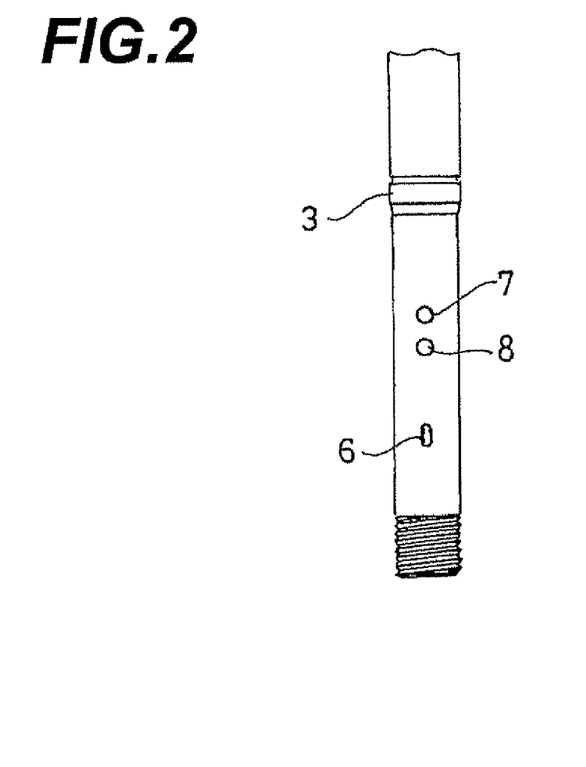
FIG. 2 is a side view of a piston rod as a housing.

FIG. 2 is a side view of the piston rod 3. As illustrated in FIG. 2, the port 6 is an oval hole extending along the axial line of the piston rod 3. Two pairs of the circular holes (hollow holes) 7 and 8 are provided in the piston rod 3 apart from the port 6. The circular holes 7 and 8 open, at above the port 6, with a clearance of 180 degrees in the circumferential direction respectively. The inside and the outside of the large diameter part 3a of the piston rod 3 are also communicated through the circular holes 7 and 8.

The circular holes 7 and 8 are opposed to the cylindrical part 21a of the above described spacer 21, and communicated to the space R3 and to the other chamber R2 through the inside of the piston rod 3.

Figure 3:
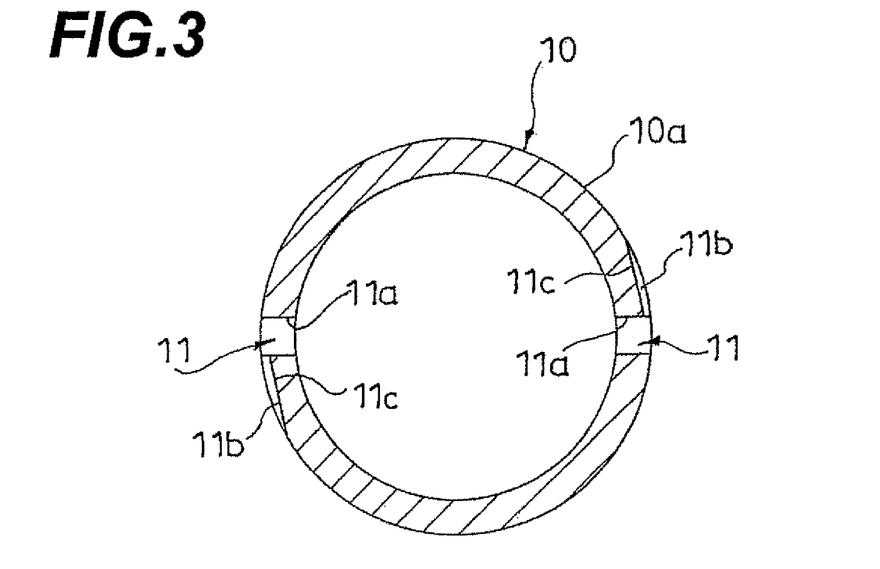
FIG. 3 is a cross sectional diagram of a tubular valve body.
Figure 4:
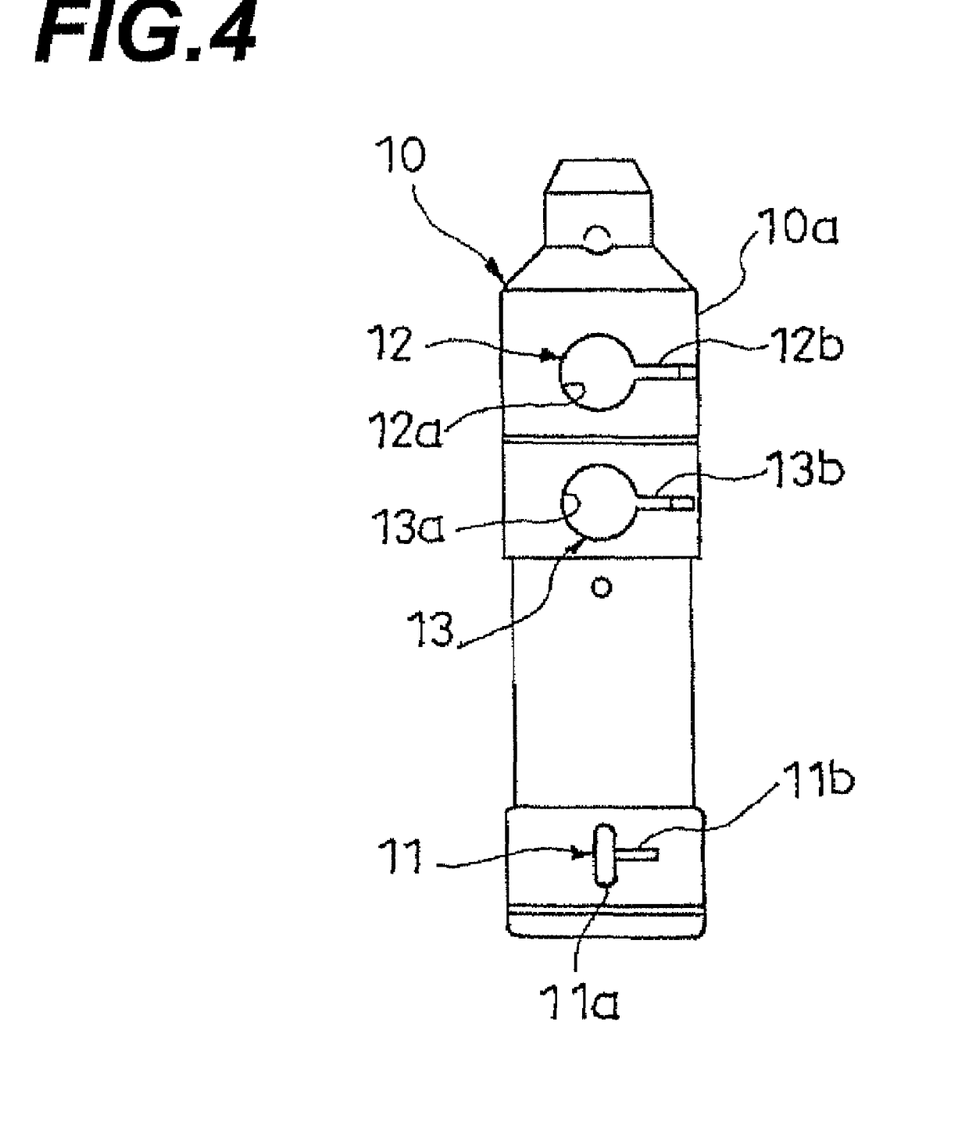
FIG. 4 is a side view of a tubular valve body.

FIG. 3 is a cross sectional diagram of the tubular valve body 10. FIG. 4 is a side view of the tubular valve body. The orifice hole 11 and the orifice holes 12 and 13 are provided to the tubular main body 10a of the tubular valve body 10. The orifice hole 11 is provided to the position capable of opposing to the port 6 at the lower side of the main body 10a. The two pairs of orifice holes 12 and 13 provided to the upper side of the main body 10a open with a clearance of 180 degrees in the circumferential direction, so that they are capable of opposing to the circular holes 7 and 8 respectively.

As illustrated in FIG. 3 and FIG. 4, the orifice hole 11 is provided with an oval hole 11a having the same shape as the port 6 extending along the axial line of the main body 10a of the tubular valve body 10, and a groove 11b continuous to the oval hole 11a and extending along the circumferential direction. The groove 11b itself is structured such that it does not penetrate through the wall thickness of the main body 10a, and does not communicate between the inside and the outside of the main body 10a. The depth of the groove 11b is deeper towards the oval hole 11a and shallower further from the oval hole 11a.

As illustrated in FIG. 4, the orifice hole 12 is provided with the circular hole 12a and the slit 12b. Likewise, the orifice hole 13 is provided with the circular hole 13a and the slit 13b. The slits 12b and 13b extend along the circumferential direction and are communicated to the circular holes 12a and 13a respectively. The slits 12b and 13b themselves also penetrate the wall thickness of the main body 10a to communicate between the inside and the outside of the main body 10a. The length of the slit 12b in the circumferential direction is longer than the length of the slit 13b in the circumferential direction.

When the orifice hole 11 is opposed to the port 6, the passage 2c and the inside of the tubular valve body 10 are communicated. Thereby, the one chamber R1 and the other chamber R2 are in a communicated state through the passage 2c, the tubular valve body 10 and the inside of the piston rod 3.

On the other hand, if the port 6 is opposed to the side surface of the main body 10a, without opposing the orifice hole 11 to the port 6, to close the port 6, the communication between the one chamber R1 and the other chamber R2 through the passage 2c is cut off.

Namely, the flow channel area in the orifice hole 11 of the rotary valve can be changed by the communicated state of the port 6 and the orifice hole 11.

Similarly, when the orifice holes 12 and 13 are opposed to the circular holes 7 and 8 respectively, the space R3 and the inside of the tubular valve body 10 are communicated. In this state, if either one of the leaf valves V3 and V4 layered on the valve disc 4 is opened, the one chamber R1 and the other chamber R2 become communicated.

On the other hand, if circular holes 7 and 8 are opposed to the side surface of the main body 10a, without opposing the orifice holes 12, 13 and the circular holes 7, 8, to close the circular holes 7, 8, the communication between the one chamber R1 and the other chamber R2 through the space R3 is cut off. Further, the flow channel area in the orifice holes 12 and 13 can be changed by changing the degree of overlapping between the circular holes 7, 8 and the orifice holes 12, 13.

It is to be noted that, as described above, the length of the slit 12b in the circumferential direction is longer than the length of the slit 13b in the circumferential direction. By using these two orifice holes 12 and 13, the range of variation of the flow channel area can be widened and the variable range of the damping force can be widened.

In the case where the speed of the expansion and contraction of the damper is in low speed range, neither of each of the leaf valves V1, V2, V3 and V4 can be opened. In this case, if the orifice hole 11 and the port 6 are in communicated state, the hydraulic oil within the one chamber R1 and the other chamber R2 is exchanged through the orifice hole 11. Thereby, the damping force is generated by the damper. By changing the flow channel area of the orifice hole 11, the damping force of the damper in the state where the speed of the expansion and contraction is in the low speed range can be adjusted.

In contrast to this, in the case where the speed of the expansion and contraction of the damper is in the middle to high speed range, since the flexure rigidities of the leaf valves V3 and V4 are set to smaller than the flexure rigidities of the leaf valves V1 and V2 layered on the piston 2, the leaf valves V3 and V4 are opened first. Thereby, the hydraulic oil within the one chamber R1 and the other chamber R2 is exchanged through the orifice holes 12 and 13. By changing the overlapping area between the orifice holes 12, 13 and the circular holes 7, 8, the damping force can be adjusted.

Further, as the speed of the expansion and contraction of the damper gets faster, the leaf valves V1 and V2 layered on the piston 2 are opened finally. In this case, the hydraulic oil within the one chamber R1 and the other chamber R2 is also exchanged through the orifice holes 12 and 13. In another word, by changing the overlapping area between the orifice holes 12, 13 and the circular holes 7, 8, the damping force can be adjusted.

In another word, in the case where the speed of the expansion and contraction of the damper is in the low speed range, the adjustment of the damping force is achieved by the adjustment of the flow channel area of the orifice hole 11. On the other hand, in the case where the speed of the expansion and contraction of the damper is in the middle to high speed range, the adjustment of the damping force is achieved mainly by the adjustment of the flow channel area of the orifice holes 12 and 13.

Figure 5A:
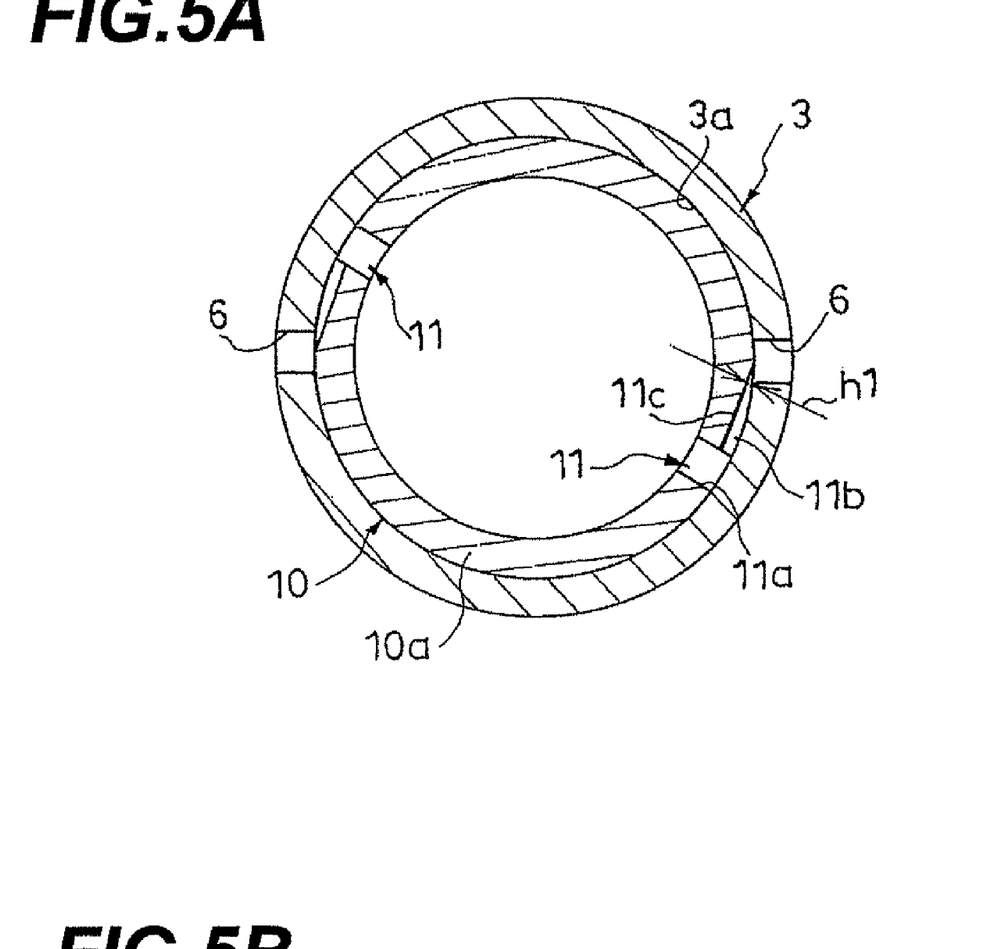
FIG. 5A is a sectional diagram of a tubular valve body in a rotation stopping position at which the flow channel area is minimized.
Figure 6A:
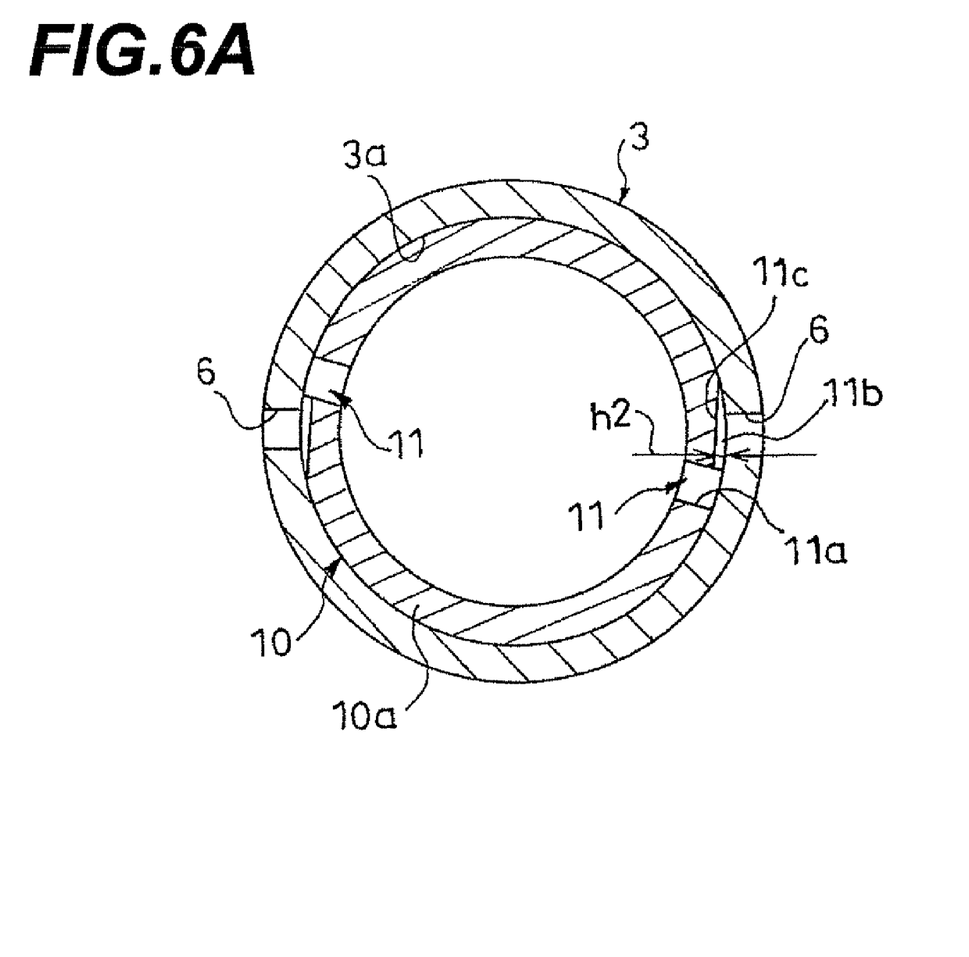
FIG. 6A is a sectional diagram of a tubular valve body in a rotation stopping position between the rotation stopping position at which flow channel area is minimized and the rotation stopping position at which flow channel area is maximized.
Figure 7A:
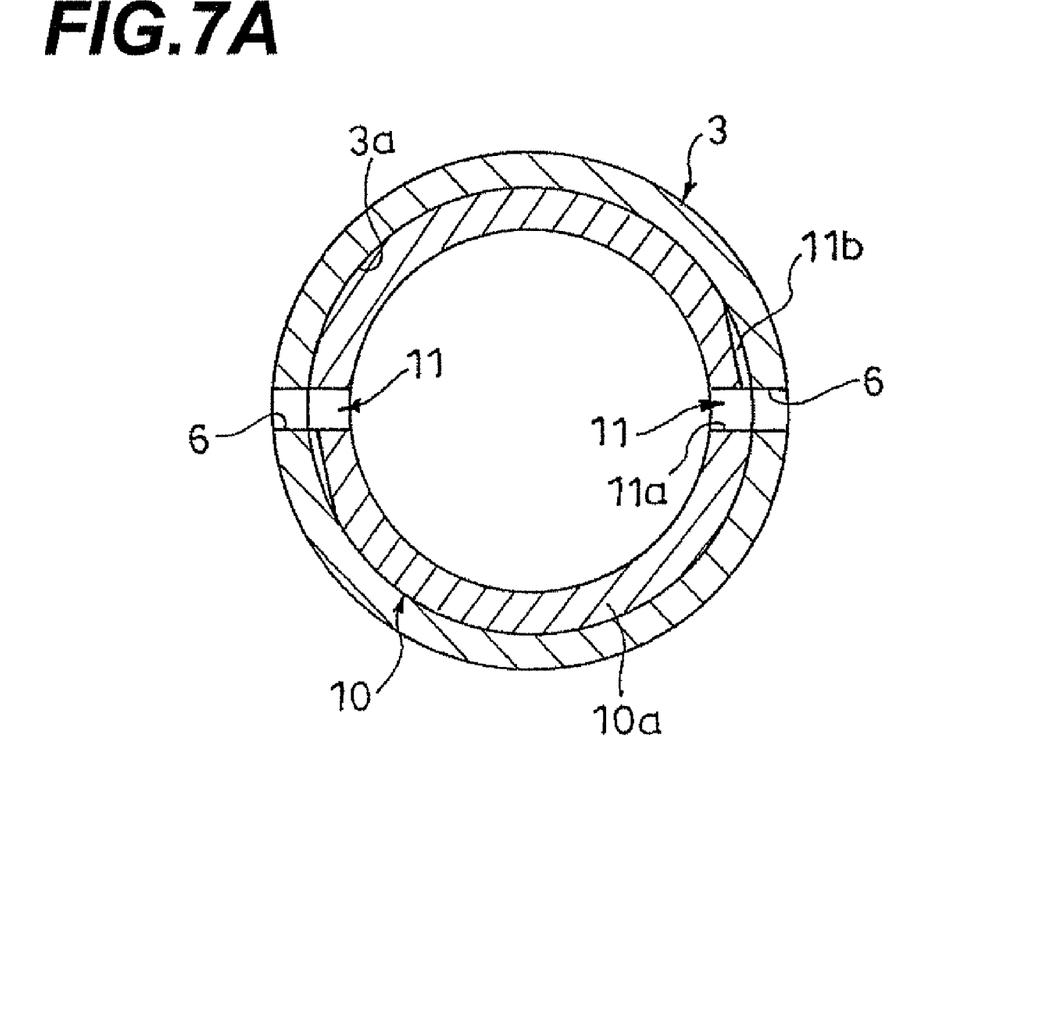
FIG. 7A is a sectional diagram of a tubular valve body in the rotation stopping position at which flow channel area is maximized.

In the present embodiment, the adjustment of the flow channel area of the orifice hole 11 is performed in 3 levels. FIG. 5A, FIG. 6A and FIG. 7A are diagrams each showing the different rotation stopping positions of the tubular valve body 10. FIG. 5A shows the rotation stopping position at which the flow channel area is minimized in the orifice hole 11. FIG. 7A shows the rotation stopping position at which the flow channel area is maximized in the orifice hole 11. FIG. 6A shows the rotation stopping position that equally divides the angle between the rotation stopping position at which the flow channel area is minimized and the rotation stopping position at which the flow channel area is maximized.

The tubular valve body 10 of the present embodiment can be revolved stepwise by 15 degrees pitch with the above described stepping motor. In another word, if the tubular valve body 10 is revolved by 15 degrees from the rotation stopping position illustrated in FIG. 5A at which the flow channel area is minimized, it is stopped at the rotation stopping position illustrated in FIG. 6A. If the tubular valve body 10 is revolved further by 15 degrees from the rotation stopping position illustrated in FIG. 6A, it is stopped at the rotation stopping position at which the flow channel area is maximized illustrated in FIG. 7A. Accordingly, the rotation stopping position illustrated in FIG. 6A is a position that equally divides the angle of 30 degrees between the rotation stopping position at which the flow channel area is minimized and the rotation stopping position at which the flow channel area is maximized into 15 degrees each.

Figure 5B:
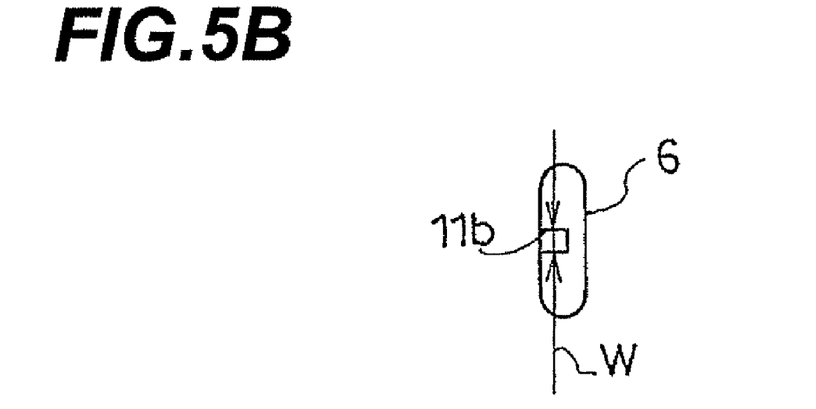
FIG. 5B is a diagram illustrating a degree of overlapping between an orifice hole of a tubular valve body and a port in the rotation stopping position at which flow channel area is minimized.

FIG. 5B is a diagram for explaining the flow channel area of the rotary valve in the rotation stopping position illustrated in FIG. 5A. The flow channel area A1 of the rotary valve in the rotation stopping position illustrated in FIG. 5A is determined by the product of the minimum distance h1 (see FIG. 5A) between the inner periphery of the large diameter part 3a of the piston rod 3 and the bottom part 11c of the groove 11b, and the width W of the groove 11b in the axial direction (the direction perpendicular to the paper face of FIG. 5A). This flow channel area A1 is set to be the smallest among the each rotation stopping positions in the state that the orifice hole 11 and the port 6 are opposed to be communicated. Additionally, as illustrated in FIG. 5B, in this rotation stopping position, the groove 11b is in the state that the tip end is overlapped with the port 6.

Figure 6B:
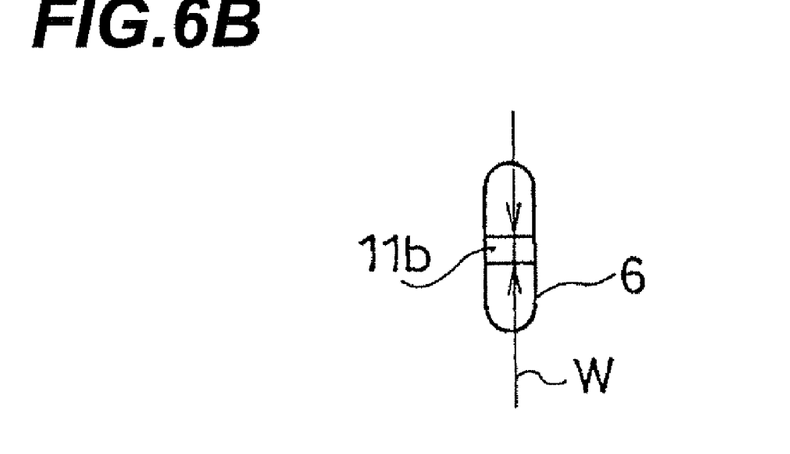
FIG. 6B is a diagram illustrating a degree of overlapping between a port and an orifice hole of a tubular valve body in a rotation stopping position between the rotation stopping position at which flow channel area is minimized and the rotation stopping position at which flow channel area is maximized.

If the tubular valve body 10 is revolved in anti-clockwise direction by only 15 degrees from the rotation stopping position shown in FIG. 5A, it is stopped at the rotation stopping position shown in FIG. 6A. FIG. 6B is a diagram for explaining the flow channel area of the rotary valve in the rotation stopping position illustrated in FIG. 6A. In this case, the flow channel area A2 of the rotary valve is determined by the product of the minimum distance h2 (see FIG. 6A) between the inner periphery of the large diameter part 3a of the piston rod 3 and the bottom part 11c of the groove 11b, and the width W of the groove 11b in the axial direction (the direction perpendicular to the paper face of FIG. 6A). This flow channel area A2 is set to be larger than the flow channel area A1. Additionally, as illustrated in FIG. 6B, in this rotation stopping position, the whole of the port 6 in the circumferential direction is overlapped with the groove 11b.

Figure 7B:
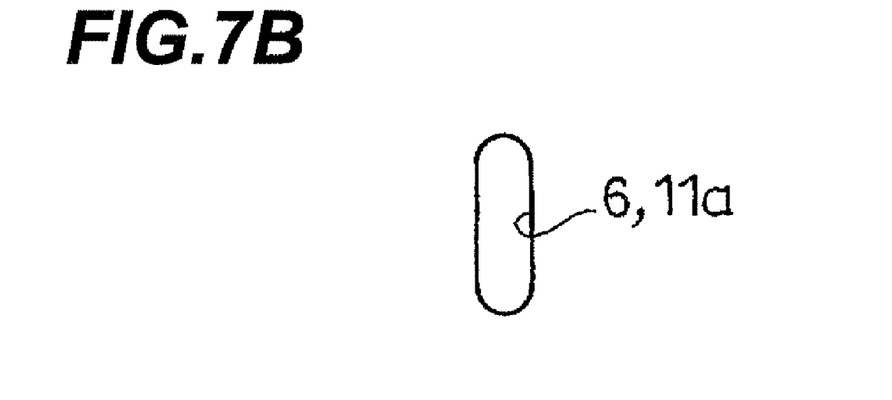
FIG. 7B is a diagram illustrating a degree of overlapping between an orifice hole of a tubular valve body and a port in the rotation stopping position at which flow channel area is maximized.

If the tubular valve body 10 is revolved in anti-clockwise direction by only 15 degrees from the rotation stopping position shown in FIG. 6A, it is stopped at the rotation stopping position shown in FIG. 7A. FIG. 7B is a diagram for explaining the flow channel area of the rotary valve in the rotation stopping position illustrated in FIG. 7A. In this case, as illustrated in FIG. 7B, since the oval hole 11a of the orifice hole 11 and the port 6 are perfectly opposed, the flow channel area A3 in the rotary valve equals to the opening area of the oval hole 11a (port 6). This flow channel area A3 is the largest among the each rotation stopping positions in the state that the orifice hole 11 and the port 6 are opposed to be communicated.

As described above, in the rotary valve of the present embodiment, by changing the rotation stopping position of the tubular valve body 10, the flow channel area can be changed over 3 levels. Respective flow channel areas A1, A2 and A3 are set such that the following conditions are satisfied. Namely, in the case where the amount of the hydraulic oil passing through the rotary valve remains constant, the pressure loss at the rotation stopping positions of the tubular valve body 10 during the flow channel area are changed from the minimum to the maximum is changed arithmetically.

Specifically, assuming that the amount of the hydraulic oil passing through the rotary valve remains constant, let the pressure loss corresponding to the flow channel area A3 in the rotation stopping position illustrated in FIG. 7A be $\Delta p$ and let the pressure loss corresponding to the flow channel area A2 in the rotation stopping position illustrated in FIG. 6A be $(\Delta p+n)$, then, the pressure loss corresponding to the flow channel area A1 in the rotation stopping position in FIG. 5A is $(\Delta p+2n)$, wherein, "n" is any numerical value.

Further, on the condition that the amount of the hydraulic oil passing through the rotary valve remains constant, next equation (1) can be obtained.

$$A3 \times \Delta p^{1/2} = A2 \times (\Delta p+n)^{1/2} = A1 \times (\Delta p+2n)^{1/2} \quad (1)$$

In another word, provided that the flowing rate is constant, the product value of the square root of the pressure loss at the orifice hole and the flow channel area becomes constant. Therefore, provided that, in addition to the condition of constant flowing rate, the condition that the pressure loss changes arithmetically is added, then the flow channel area A1, A2 and A3 can be calculated out in a back calculation manner. In this manner, by setting the flow channel area in the orifice hole 11 of the rotary valve in the present embodiment, the pressure loss in each of the rotation stopping position of the tubular valve body 10 can be changed arithmetically.

Accordingly, in the case where the speed of the expansion and contraction is in low speed range, the damping force of the damper in the present embodiment can be adjusted in 4 levels, including additional case in which the port 6 is closed by the tubular valve body 10, as well as the cases in 3 levels in which the communicated states of the port 6 and the orifice hole 11 are maintained.

As described above, in the present embodiment, the pressure loss caused when the hydraulic oil is passing through the rotary valve can be changed arithmetically between the adjacent rotation stopping positions. Thereby, the damping force in the case where the port 6 and the orifice hole 11 are maintained in the communicated state can be changed arithmetically even when the speed of the expansion and contraction of the damper is in the low speed range. Thus, the damping force according to the preferences of the passengers on the vehicle mounted with the damper can be generated and the comfortableness on the vehicle can be improved.

The shape of the port 6 and the shape of the orifice hole 11 are not limited to the above described shape. However, as described above, by making the shape of the port 6 into an oval hole extending along the axial direction, and further, providing the oval hole 11a of the same shape to the orifice hole 11, the variation of the flow channel area when the port 6 and the oval hole 11a are opposed can be widened, in comparison to the flow channel area in the state where the port 6 and the groove 11b are opposed. The reasons for widening the range of variation of the flow channel area are described as follows.

According to the conditions shown in the equation (1), it is necessary to have wide range of variation of the flow channel area to make the value "n" larger relative to the value $\Delta p$ in the case where the flow channel area is maximized. Therefore, there is an advantage to make the shape of the port 6 and the shape of the orifice hole 11 into the above described shape. For example, given that $\Delta p=0.03$ and $n=13$, then, the ratio of the flow channel areas in each of the stopping positions A1:A2:A3 becomes about 1:1.4:29. Namely, it will be understood that there may be a case where the range of variation of the flow channel area must be wide.

In another word, by making the shape of the port 6 into the oval hole extending along the axial direction of the piston rod 3 which is a housing, and constructing the orifice hole 11 with the oval hole 11a of the same shape and the groove 11b which is continuous to this oval hole 11a and extends along the circumferential direction of the tubular valve body 10, the range of variation of the flow channel area from the minimum to the maximum can be set wide. Further, by making the groove 11b such that the depth thereof is deeper towards the oval hole 11a and shallower further from the oval hole 11a, the range of variation of the flow channel area can be widened more effectively. Thereby, the range of damping force adjustment is significantly widened compared to the conventional cases, and so, comfortableness on the vehicle can further be improved.

The rotary valve in the embodiment comprises the housing 3 having, at the side part thereof, the port 6 which is tubular and communicates the inside and the outside, and the tubular valve body 10 which is contained in the housing 3 in the rotatable manner in the circumferential direction and has, at the side part thereof, the orifice hole 11 capable of opposing to the port 6. The flow channel area formed by communicating the port 6 and the orifice hole 11 can be changed by rotating the tubular valve body 10. This rotary valve has following characteristics. Namely, as a rotation stopping position, at least one rotation stopping positions which equally divide the angle between the rotation stopping position at which the flow channel area is minimized and the rotation stopping position at which the flow channel area is maximized is provided. In the case where the passing flowing rate remains constant, since the pressure loss at the rotation stopping positions during the flow channel area are changed from the minimum to the maximum is set to be changed arithmetically, it is not necessary to specially control the motor to arithmetically change the pressure loss. That is to say, the pressure loss can be changed arithmetically only by revolving the tubular valve body 10 at a prescribed revolving angle determined for the stepping motor.

Further, in the case where the flow channel area is set by the overlapping area between the port 6 and the groove 11b, by constructing the damper as described above, the variable range of the flow channel area can be set to be wide. Namely, in the rotation stopping position at which the flow channel area is minimized, as illustrated in FIG. 5B, the tip end of the groove 11b of the orifice hole 11 is opposed to the port 6, and in the rotation stopping position at which the flow channel area is maximized, as illustrated in FIG. 7B, the oval hole 11a of the orifice hole 11 is opposed to the port 6. Further, in the rotation stopping position at which the flow channel area is in between the minimum and the maximum, as illustrated in FIG. 6B, the whole of the port 6 in the circumferential direction is opposed to the groove 11b of the orifice hole 11.

The present invention is not limited to the above described one embodiment. For example, the rotary valve of the present invention can also be applied to the other part of the damper without using the piston rod as the housing, and can also be used in the other applications other than the damper.

In the present embodiment, the only one rotation stopping position of the tubular valve body 10 is provided between the rotation stopping position at which the flow channel area is minimized and the rotation stopping position at which the flow channel area is maximized. However, a plurality of rotation stopping positions can be provided. For example, in the case where two rotation stopping positions are provided between the rotation stopping position (minimum rotation stopping position) at which the flow channel area is minimized and the rotation stopping position (maximum rotation stopping position) at which the flow channel area is maximized, if the angle between the minimum rotation stopping position and the maximum rotation stopping position is 30 degrees, this 30 degrees may be equally divided by the two rotation stopping positions. Therefore, the two rotation stopping positions may be provided at the positions apart from the minimum rotation stopping position by 10 degrees and 20 degrees respectively, and the pressure losses at the four rotation stopping positions may be set to be changed arithmetically.

Further, in the present embodiment, for the settings of the flow channel area other than the maximum flow channel area, the minimum distance between the bottom part 11c of the groove 11b and the inner periphery of the large diameter part 3a of the piston rod 3, and the width of the groove 11b are used. However, the flow channel area may be set by the overlapping area between the port 6 and the groove 11b by setting such that the inside and the outside of the main body 10a are communicated through the groove 11b.

What is claimed is:

1. A rotary valve comprising:
a tubular housing having, at the side part, a port for communicating the inside and the outside thereof, and
a tubular valve body which is contained within the housing rotatably in the circumferential direction and has, at the side part, an orifice hole capable of opposing to the port, wherein a flow channel area of the rotary valve formed by communicating the port and the orifice hole is changed by rotating the tubular valve body, wherein:
the tubular valve body is configured to stop at a plurality of rotation stopping positions including a minimum rotation stopping position at which the flow channel area is minimized, a maximum rotation stopping position at which the flow channel area is maximized, and at least one intermediate rotation stopping position;
an angle is formed between the tubular valve body at the minimum rotation stopping position and the tubular valve body at the maximum rotation stopping position;
said at least one intermediate rotation stopping position equally divides said angle between the minimum rotation stopping position and the maximum rotation stopping position, such that each angle formed between two adjacent ones of said plurality of rotation stopping positions is the same; and
each difference in pressure loss between two adjacent ones of said plurality of rotation stopping positions is the same, on condition that a passing flowing rate remains constant.

2. The rotary valve according to claim 1, wherein:
the orifice hole has a hole for communicating with the port, and a groove continuous to the hole and extending along a circumferential direction of the tubular valve body.

3. The rotary valve according to claim 2, wherein:
a depth of the groove is deeper towards the hole and shallower further from the hole.

4. The rotary valve according to claim 1, wherein:
the port is an oval hole extending along an axial direction of the housing, and
the orifice hole has an oval hole extending along an axial direction of the tubular valve body, and a groove continuous to the oval hole and extending along a circumferential direction of the tubular valve body.

5. The rotary valve according to claim 4, wherein:
a depth of the groove is deeper towards the oval hole of the orifice hole and shallower further from the oval hole of the orifice hole.

6. The rotary valve according to claim 4, wherein:
a tip end of the groove of the orifice hole is opposed to the port in the minimum rotation stopping position, the oval hole of the orifice hole is opposed to the port in the maximum rotation stopping position, and the whole of the port in a circumferential direction of the tubular valve body is opposed to the groove of the orifice hole in the intermediate rotation stopping position.

7. The rotary valve according to claim 4, wherein:
at the maximum rotation stopping position, the flow channel area is determined by an opening area of the oval hole of the orifice hole.

8. The rotary valve according to claim 1, wherein:
the housing is a piston rod which supports a piston inserted in a cylinder in a freely slidable manner for partitioning an inside of the cylinder into two chambers including a first chamber and a second chamber, and comprises a hollow hole continuous to the first chamber, and a further port for communicating the hollow hole and the second chamber.

9. The rotary valve according to claim 8, wherein:
the orifice hole has a hole for communicating with the port, and a groove continuous to the hole and extending along a circumferential direction of the tubular valve body, and
at the minimum rotation stopping position, the flow channel area is determined by a product of a width of the groove in an axial direction of the tubular valve body and a minimum distance between an inner periphery of the piston rod and a bottom part of the groove.

10. The rotary valve according to claim 8, wherein:
the orifice hole has a hole for communicating with the port, and a groove continuous to the hole and extending along a circumferential direction of the tubular valve body, and
at the intermediate rotation stopping position, the flow channel area is determined by a product of a width of the groove in an axial direction of the tubular valve body and a minimum distance between an inner periphery of the piston rod and a bottom part of the groove.

* * * * *